United States Patent [19]

Son et al.

[11] Patent Number: 4,659,230
[45] Date of Patent: Apr. 21, 1987

[54] MIXING ELEMENT FOR COMPOUNDS AND EXTRUDING MACHINERY

[75] Inventors: Jaime S. Son; Philip C. Lewellen, both of Houston, Tex.

[73] Assignee: Shell Oil Company, Houston, Tex.

[21] Appl. No.: 739,573

[22] Filed: May 30, 1985

[51] Int. Cl.⁴ ............................ B28C 1/16; B01F 7/08
[52] U.S. Cl. ...................................... 366/343; 366/81; 366/89
[58] Field of Search .................. 366/81, 88, 89, 90, 366/319, 321, 323, 324, 343, 342; 425/207, 208

[56] References Cited

U.S. PATENT DOCUMENTS

| | | | |
|---|---|---|---|
| 2,838,794 | 6/1958 | Munger | 366/81 |
| 3,751,015 | 8/1973 | Hensen | 366/81 |
| 3,762,693 | 10/1973 | DeBoo | 366/81 |
| 4,103,353 | 7/1978 | Dougherty | 366/81 |

Primary Examiner—Robert W. Jenkins
Attorney, Agent, or Firm—Paul I. Douglas

[57] ABSTRACT

A rotor element for use in extrusion and compounding machinery that incorporates means for mixing a low viscosity or immiscible additive with high viscosity base stocks such as polymer melts. The rotor incorporates a combination of one or more helical flights with an array of mixing pins arranged in the cylindrical screw root.

4 Claims, 3 Drawing Figures

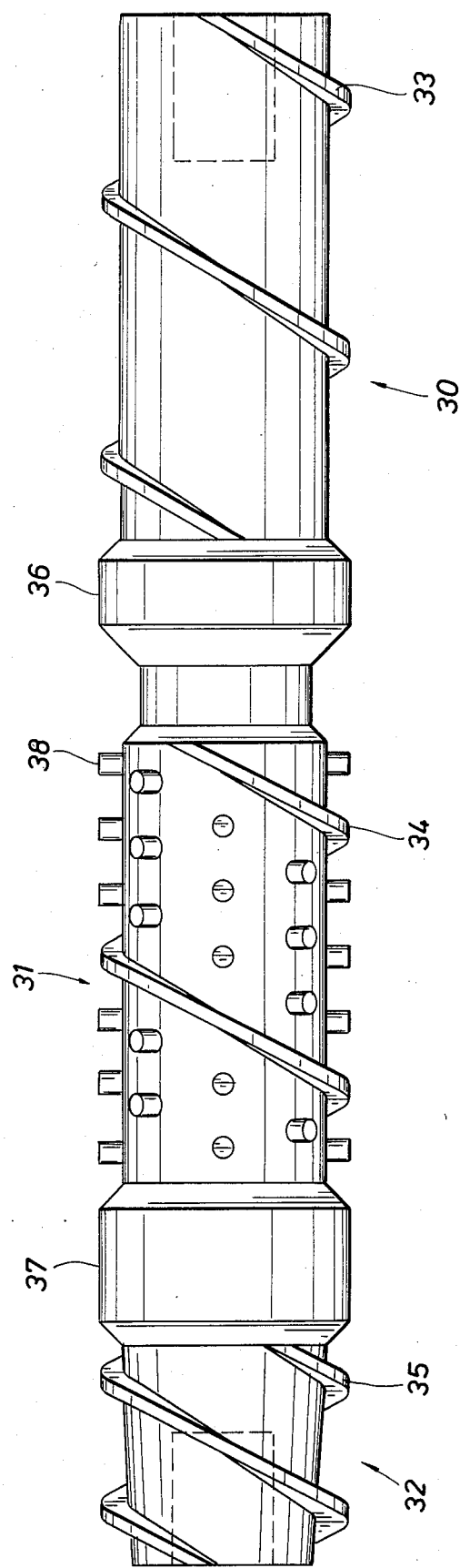

MIXING ELEMENT FOR COMPOUNDS AND EXTRUDING MACHINERY

BACKGROUND OF THE INVENTION

The present invention relates to extrusion machinery for thermoplastics and particularly to the design of the rotor used in the extruding machinery. In the extrusion of plastics, at times it is necessary to mix a low viscosity or immiscible additive with a high viscosity polymer melt. The low viscosity or immiscible ingredient may be a coloring agent, an ingredient used to improve performance of the polymer product, or a material which facilitates subsequent processing of the polymer. Volatile materials introduced in order to cool the polymer by evaporation at a downstream location in the extruder exemplify this latter class of ingredients. It is, of course, required that the low viscosity ingredient be intimately mixed with the polymer melt prior to extrusion to provide a uniform extrusion. In addition, it is frequently important that the mixing be accomplished with minimal dissipation of energy in the polymer and in as short a time as possible in order to reduce thermal and mechanical damage to the polymer.

Mixing a low viscosity fluid into a high viscosity polymer melt is not a simple task. Karam and Bellinger I&EC Fundamentals, Vol. 7, No. 8, pp. 576–581, 1968, have shown experimentally that breakup of droplets into smaller droplets - as required for intimate mixing - is very unlikely to occur when the viscosity of the dispersed phase is 0.005 or less of the viscosity of the bulk phase. Numerical calculations have confirmed, in the words of Rallison, "The Deformation of Small Viscous Drops and Bubbles in Shear Flows, Annual Review of Fluid Mechanics, 1984, Vol. 16, pp 45–66, that "low viscosity drops can attain highly extended stable shapes and require very strong flows to break them."

One possible solution to the mixing of low viscosity or immiscible ingredients with a high viscosity polymer melt is discussed in an article by T. Sakai entitled "Observations on the Flow Behavior in Twin Screw Extruders with Mixing Elements" appearing in Vol. 38, No. 4, pp 279–284, 1981, of Kobunshi Ronbunshu. In this article there is discussed the performance of various types of rotors used in extruding elements, together with observations of mixing behavior vis a vis additives of viscosity comparable to that of the polymeric fluid. One of the rotors shown comprises a flighted rotor having a section in the center in which the forward flights are removed and replaced by radial mixing pins described in the article. This type of rotor has been used in both single screw and twin screw extruders. Other mixing elements of similar design have been described by C. Y. Cheng, "Extruder Screw Design for Compounding", Plastics Compounding, Vol. 4, No. (2), March–April 1981, pp 29–40, and by B. Gallagher and A. G. M. Last, "Process for Improving the Dispersion of Blowing Agents in Thermoplastics", United Kingdom Pat. No. 1,410,979.

While the rotor elements having mixing pins as described in the above articles can provide some mixing of a low viscosity or immiscible additive with a high viscosity polymer melt, they do so at the price of very high energy dissipation in the melt. In addition, because the elements described have little or no forwarding capability, the polymer channels in the elements are completely filled with polymer at all times. This increases the residence time of the melt in the mixing stage as well as leading to a requirement that upstream stages of the extrusion machinery generate sufficient pressure to cause the melt to flow through the mixing stage. Both factors increase the potential for mechanical and thermal damage to the polymer. Moreover, complete fillage of the polymer channels leads to reduced mixing efficacy as described below.

SUMMARY OF THE INVENTION

The present invention results from the discovery that the rate of energy dissipation and the residence time can be reduced while still maintaining proper mixing of the low viscosity ingredient in the high viscosity polymer melt by placing the mixing pins in the root area of the flights of the extruding rotor. The rotor can have single or multiple flights, as well as single or multiple rows (or other arrays) of mixing pins disposed in the root area. One successful rotor utilized a single forwarding flight with three helical rows of mixing pins arranged in a multiple start pattern in the cylindrical screw root.

This combination of flighting and mixing pins produces a complex flow field leading to mixing action which is much superior to that provided by either element alone. Further, since the forwarding flight is continuous, the rotor may be operated in a manner to ensure that the polymer channel remains partially empty. This provides enhanced mixing efficacy, reduced residence time in the mixing stage, and eliminates any demand upon upstream stages for pressure generation. Finally, the single forwarding flight provides a measure of self cleaning capacity which maintains the extruder relatively clean of polymer, further reducing opportunities for polymer degradation to occur.

In contrast to the rotor of the present invention, the rotors described in the above article, by having interrupted forwarding flights, do not provide self cleaning action and the pressure required to force the polymer mixture across the interrupted areas in the forwarding flights is greatly increased.

BRIEF DESCRIPTION OF THE DRAWINGS

The present invention will be more easily understood from the following description when taken in conjunction with the attached drawings in which:

FIG. 3 is an elevation view of a second extruding rotor constructed according to this invention.

DESCRIPTION OF PREFERRED EMBODIMENTS

Figure 2:
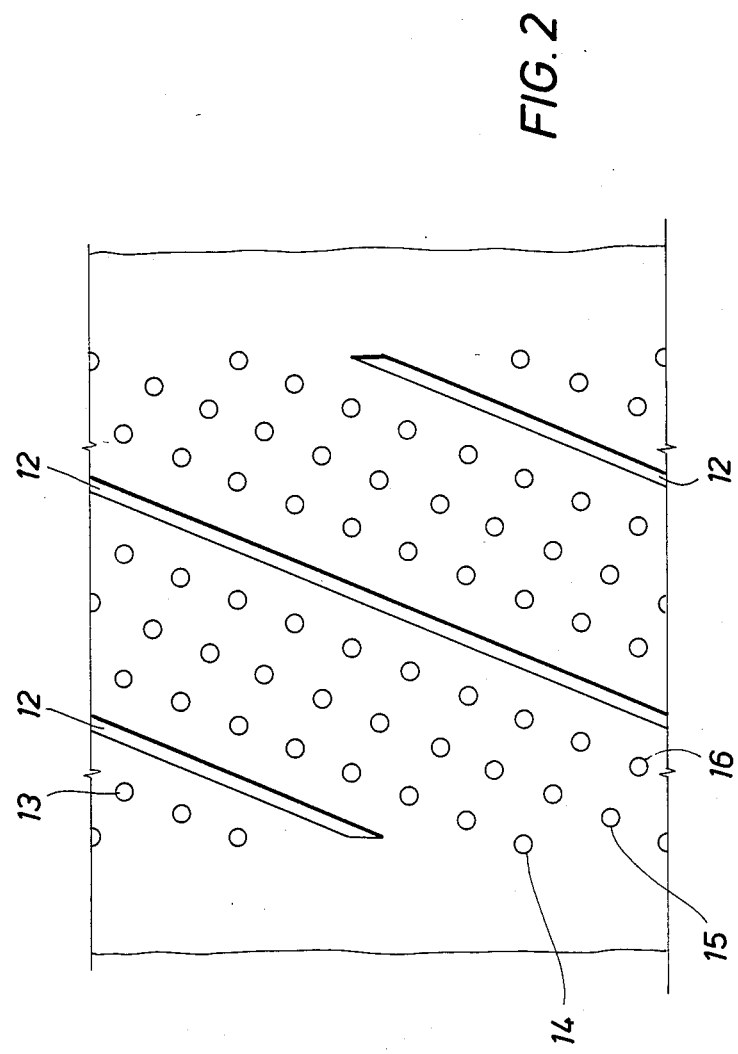
FIG. 2 is the forwarding flight and mixing pin arrangement of the rotor shown in FIG. 1 in an unwrapped projection.

Referring to the attached drawing, there is shown a rotor for use in polymer plastic extruding equipment that incorporates the mixing elements of the present invention. The rotor utilizes a cylindrical rotor shaft 10 having a section 11 on which the forwarding flight and mixing pins are formed. A single forwarding flight 12 is formed on the exterior of section 11, while three individual helical rows 14, 15 and 16, of mixing pins 13, are disposed in the root portion of the shaft member. As is seen in FIG. 2, the three helical rows of mixing pins are arranged in a multiple start pattern. The diameter of the forwarding flight 12 should be only slightly smaller than that of the enclosing barrel. This provides better forwarding action and better cleaning action of the rotor in the extruder barrel. The diameter of the mixing pins 20 should be substantially the same as or smaller than the diameter of the forwarding flight 12. In the preferred embodiment, the diameter of the pins is less than that of the flight to minimize migration of the additive to the barrel along the pins.

The rotor can be fabricated by fabricating the forwarding flight 12 on the rotor and then installing the mixing pins 13 in the root area. In particular, the mixing pins may be installed in holes 17 formed in the appropriate location by using press fits or similar operations.

Figure 1:
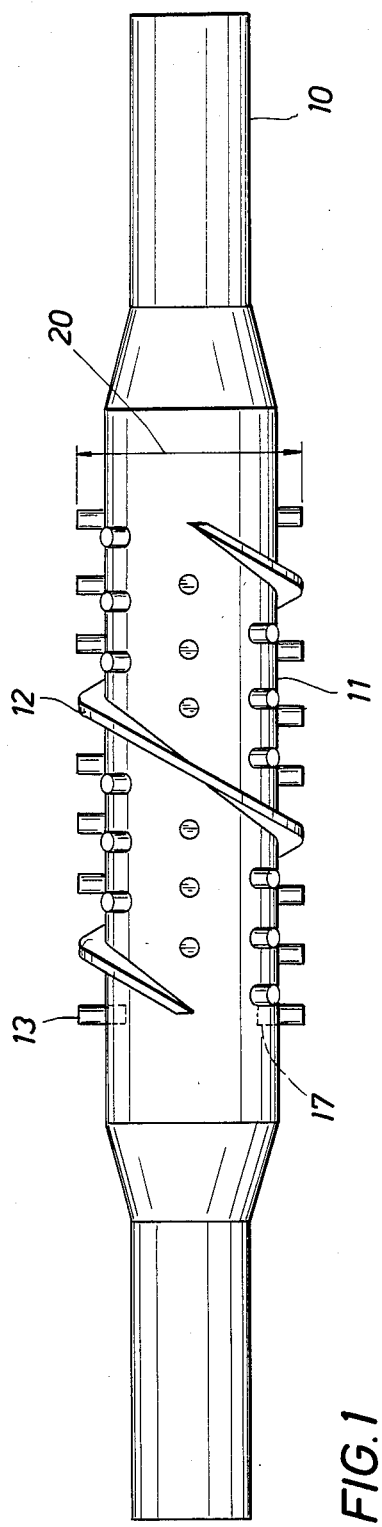
FIG. 1 is an elevation view of an extruding rotor constructed according to this invention.

It has been found that a rotor section having a length of one to two diameters of the forwarding flight is sufficient to provide good mixing of low viscosity and high viscosity materials. The forwarding flight preferably has a pitch equal to its diameter as shown in FIG. 1. Of course, other pitches could be used for the forwarding flight but the above ratio of equal pitch and diameter has been found to produce excellent results when using three helical rows of mixing pins. Further, while a single forwarding flight is shown, it is possible to use multiple forwarding flights and reduce the number of rows of mixing pins. For example, the row 15 of mixing pins could be replaced by a forwarding flight on the rotor.

Referring to FIG. 3 there is shown a second embodiment of the invention in which the extruding screw is formed in three distinct sections 30, 31 and 32. The inlet section 30 has a single start flight 33 the center section 31 has a single start flight 34 while the discharge section 32 has double start flights 35. The three sections are separated by blister sections 36 and 37 which have a smooth outer diameter that is slightly smaller than the overall diameter of the flights 33 and 35. The blister section 36 serves to retain the high viscosity material in the section 30 and, thus, increase the pressure in this section. The high pressure in turn prevents the low viscosity material being added in the mixing section 31 from flowing backwards into the section 30 containing the high viscosity material. Similarly, the blister section 37 serves to retain the high viscosity material in the mixing section 31 by restricting the discharge of the material into the discharge section 32. By retaining the material in section 31 complete mixing of the low viscosity material in the high viscosity material will occur. Positioned in the root area of the flight 34 are three rows of mixing pins 38 that are disposed in helical rows similar to the arrangement of FIG. 2. The remaining details of the mixing screw of FIG. 3 are similar to that described above for the mixing screw shown in FIGS. 1 and 2. The overall diameter of the flights should be slightly smaller that the diameter of the barrel while the pitch of the flight is equal to its diameter.

Extruding screw showing in FIG. 3 can be used either singularly or a pair may be mounted in a side by side relationship in a twin barrel housing. In one installation, two of the mixing screws shown in FIG. 3 were used in a double barrel mixer to mix water with a styrene butadiene copolymer plastic. After mixing, the water is flashed off downstream in a vacuum stage to reduce the temperature of the melted plastic. To achieve maximum benefit it is necessary that the water be well dispersed in the melted polymar so that the cooling effects are uniform throughout the polymer. Normally, 0.5% to 2% by weight of water is mixed with the polymer to provide the cooling function. Use of the screw shown in FIG. 3 resulted in approximately 10 to 15% increase in the temperature reduction of the polymer over that obtained using a conventionally flighted screw without the mixing pins shown in the screw in FIG. 3.

Other less regular arrays of pins may also be used, as in the rotors described above, where every third pin on the rotor drawn is removed. Also, the pitch of the flights and the various diameters may be varied.

What is claimed is:

1. A mixing rotor element for use in an extrusion and compounding machine, comprising:
    a cylindrical shaft member;
    a pair of blister elements, said blister elements being formed on the outer surface of said shaft at spaced locations to divide said shaft into a center and two end sections;
    a first single flight, said first single flight being formed on the outer surface of one end section of said shaft member;
    a second single flight, said second single flight being formed on the outer surface of the center section of said shaft member;
    a double flight, said double flight being formed on the outer surface of the other end section of said shaft member; and
    a plurality of rows of mixing pins, said mixing pins being disposed in the land portion of the center section of said shaft member.

2. The mixing rotor element of claim 1 wherein said blisters have an overall diameter smaller than the overall diameter of said flights.

3. The mixing rotor element of claim 2 wherein said single flights have a pitch at least equal to their overall diameter.

4. The mixing rotor element of claim 1 wherein said mixing pins are disposed in three helical rows.

* * * * *